United States Patent [19]

West

[11] Patent Number: 4,572,716

[45] Date of Patent: Feb. 25, 1986

[54] PAPERBOARD SHIPPING CHOCK AND ASSEMBLY

[75] Inventor: Kenneth O. West, Escanaba, Mich.

[73] Assignee: The Mead Corporation, Dayton, Ohio

[21] Appl. No.: 682,062

[22] Filed: Dec. 17, 1984

Related U.S. Application Data

[63] Continuation-in-part of Ser. No. 426,859, Sep. 29, 1982, abandoned.

[51] Int. Cl.⁴ .............................................. B61D 45/00
[52] U.S. Cl. ..................................... 410/36; 206/522; 220/23.2; 410/42; 410/47; 410/119
[58] Field of Search ...................... 410/31, 32, 34, 36, 410/38, 39, 42, 47, 49, 117, 118, 119, 121, 122, 123, 124, 125, 128, 154; 206/522; 220/23.2, 23.4, 437, 438

[56] References Cited

U.S. PATENT DOCUMENTS

| | | | |
|---|---|---|---|
| 1,833,764 | 11/1931 | Tremblay et al. | 410/36 |
| 2,288,622 | 7/1942 | Heigis | 410/68 X |
| 2,295,609 | 9/1942 | Shimon | 410/124 X |
| 2,363,256 | 11/1944 | Manning et al. | 410/117 X |
| 2,601,935 | 7/1952 | Auch | 410/123 X |
| 2,611,495 | 9/1952 | Weaver | 410/42 |
| 2,620,748 | 12/1952 | Shields | 410/68 |
| 2,718,302 | 9/1955 | Capaldi | 206/499 |
| 2,766,660 | 10/1956 | Laddon et al. | 410/42 X |
| 2,846,959 | 8/1958 | Perry | 410/121 |
| 2,849,027 | 8/1958 | Tetyak | 410/42 X |
| 3,028,981 | 4/1962 | Ford et al. | 410/117 |
| 3,091,348 | 5/1963 | Neuhauser | 206/391 |
| 3,145,853 | 8/1964 | Langenberg | 410/125 |
| 3,581,674 | 6/1971 | O'Leary | 410/49 X |
| 3,872,799 | 3/1975 | Dousset | 410/125 |
| 3,949,227 | 12/1976 | Burdis | 378/60 |
| 4,195,732 | 4/1980 | Bell | 206/391 |
| 4,241,810 | 12/1980 | Newlon | 410/49 X |
| 4,305,508 | 12/1981 | Rodgers | 410/49 X |
| 4,382,733 | 5/1983 | Rodgers | 410/49 |

FOREIGN PATENT DOCUMENTS

2216053 7/1973 Fed. Rep. of Germany ........ 410/49

Primary Examiner—Randolph A. Reese
Assistant Examiner—David F. Hubbuch
Attorney, Agent, or Firm—Arnold, White & Durkee

[57] ABSTRACT

A device in which units being transported can be adequately secured for protecting those units from damage during shipment. A chock that engages and substantially conforms to the surface of the unit to be secured is utilized. The paperboard chock can be utilized in numerous ways. The paperboard chock can be used independently by inserting it between a rigid structure and the unit to be secured such that the chock actively engages both the unit to be secured and the rigid structure. Two chocks could be used together by inserting the chocks between two units to be secured such that the chocks actively engage the units and are flush with each other. Various alternative schemes of use can be utilized by inserting a cushioning means against the chock to apply pressure to the unit to be secured. The chock comprises contact elements and a support element. The contact elements actively engage the unit to be secured and are themselves attached to the support element. The support element engages a rigid or cushioning structure so as to apply force to the contact element which therefore applies force and thereby secures the unit being transported.

9 Claims, 2 Drawing Figures

PAPERBOARD SHIPPING CHOCK AND ASSEMBLY

This application is a continuation-in-part of application Ser. No. 426,859, filed Sept. 29, 1982, now abandoned.

BACKGROUND OF THE INVENTION

This invention relates generally to methods and devices for absorbing mechanical shock and more particularly to methods and devices for fixing the position of rolls of web material during transportation.

In the past, it has been common to secure rolls of paper or other cylindrical units by the use of metal bands. This was adequate for securing cylindrical units around the circumference of a holding compartment in a shipping vessel. It was not adequate when the shipping compartment was large and additional cylinders had to be placed inside those that surrounded the circumference of the holding compartment. To secure the interior cylindrical units, paper or disposable air bags have been inserted between the units to be transported to fix their position. This technique has proved to be less than satisfactory as a means for securing rolls of web material, such as paper, or other units to be transported.

Inflatable air bags have been utilized for securing rolls of web material or other units to be transported. The rolls were shipped positioned on end with the convex surfaces in contact with one another or with air bags inserted between the convex surfaces not in contact. The air bags were inflated to stabilize the load during shipment. Also, it has been standard practice to use inflatable air bags between the units near the door to compensate for the gap usually created by imperfect spacing. By filling in the unused space, the air bags were to secure the transported units preventing movement and damage.

However, due to the convex surface of the rolls, air bags alone do not offer sufficient support to prevent the rolls from moving. The air bags alone have proved to be unsatisfactory. Severe impacts have resulted in air bag rupture due to the concentration of force in the center of the bag by the convex surface of the rolls of web material. Even if the bags do not rupture, the rolls may still shift to relieve the pressure applied by the inflatable air bag. This allows for further movement which results in the rolls being damaged. Therefore, due to the flexibility of the inflatable air bag and the contour of the paper rolls, movement and damage has been noted.

The art has employed complex and expensive techniques to solve the movement and damage problem. U.S. Pat. No. 4,195,732 to Bell, assigned to Great Northern Corporation and Presto Products, Inc., discloses one such approach. The Bell patent utilizes a stacking assembly for protecting the ends and sides of the entire roll of web material. The patent is directed to a structure for protectively supporting and spacing rolls of web material in a multilayer horizontal stack.

It is, therefore, a general object of the present invention to povide a novel paperboard shipping assembly and chock which minimizes or reduces problems of the type previously noted.

It is, therefore, an object of the present invention to retain the relative position of units of web material by filling in unwanted space. The present invention allows for space to be filled in between adjacent cylindrical units or between a cylindrical unit and an adjacent rigid structure.

A further object of the present invention is to prevent damage to the cylindrical units of web material by maintaining the relative position of the units.

A further object of the present invention is to distribute cushioning over a significant area of the cylindrical units of web material. This allows the pressure applied by a cushioning means to be more evenly distributed over the surfaces of the cylindrical units of web material thereby enhancing the ability to secure the transported units.

Still another object of the present invention is to effectively eliminate the instance of air bag failure upon severe impact.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, a shipping assembly is provided for use in maintaining the relative position of cylinders of web material which comprises a paperboard support element, one or more paperboard contact elements and means for cushioning the cylinders of web material.

The paperboard support element and the paperboard contact elements are fixedly adhered to each other such that a face thereof defines a surface for engaging the surface of a cylinder of web material. The support elements and the contact elements may have an internal honeycomb structure.

Preferably, the means for cushioning consists of an inflatable air bag. The inflatable air bag provides an even distribution of force from the support element and the contact elements over the engaged surface of the cylinder of web material.

In another sense, applicant's invention comprises a chock for securing the cylindrical rolls of web material. The chock is made of a support element and contact elements that are rigidly attached to the support element. The face cooperatively created by the support element and the contact elements defines a surface for engaging the surface of the unit to be secured.

BRIEF DESCRIPTION OF THE DRAWINGS

The accompanying drawings illustrate a preferred embodiment of the invention, and, together with the general description of the invention given above and the detailed description of the preferred embodiment given below, serve to illustrate the invention.

The above general description and the following detailed description are merely illustrative of the invention, and additional modes, advantages, and particulars of this invention will be readily suggested to those skilled in the art without departing from the spirit and scope of the invention.

DESCRIPTION OF THE PREFERRED EMBODIMENT

Reference will now be made in detail to the present preferred embodiment of the invention as shown in the accompanying drawings.

Figure 1:
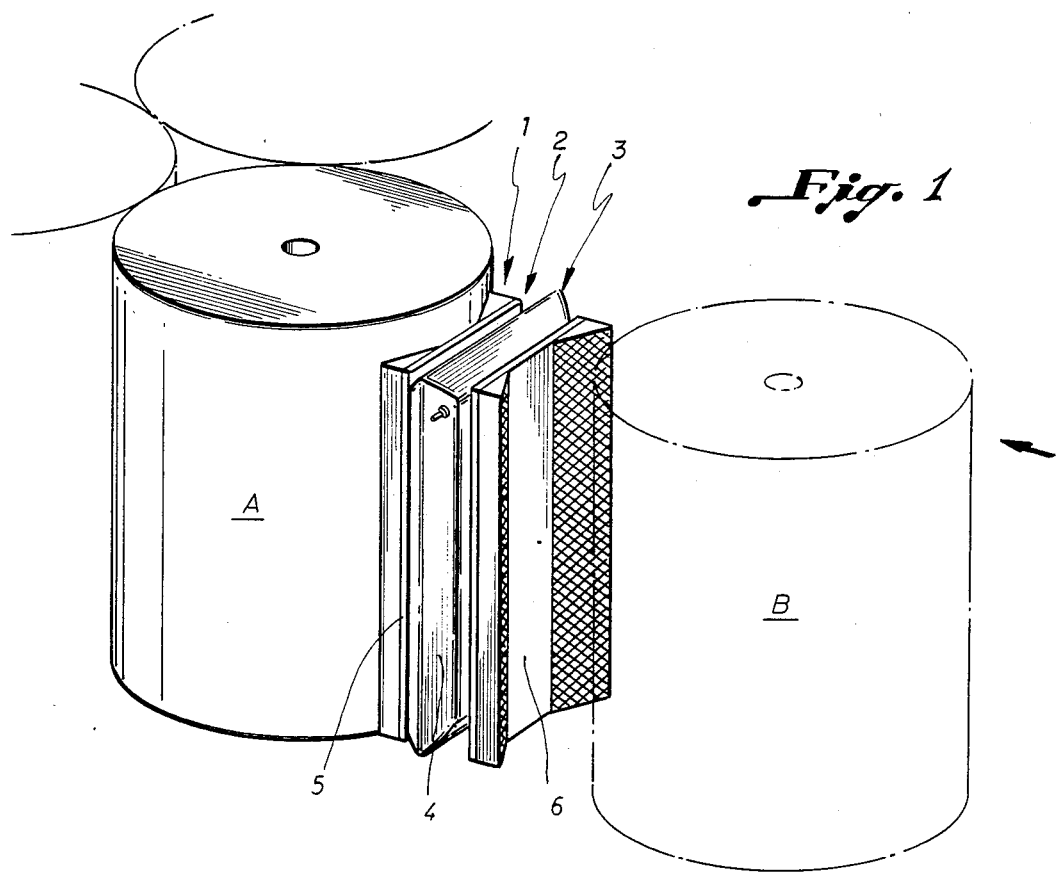
FIG. 1 is a perspective view of a shipping assembly designed in accordance with the present invention.

In FIG. 1 there is shown an apparatus in perspective view which illustrates the teachings of the present invention. In FIG. 1 there is shown a shipping assembly 4 engaged with cylindrical unit of web material A and disengaged with cylindrical unit of web material B. The shipping assembly 4 is made up of the means for cushioning 3 sandwiched by shipping chocks 5 and 6. Each shipping chock comprises support element 2 and contact elements 1. Support element 2 of shipping chocks 5 and 6 may be planar and may be made from paperboard, and further may be made from paperboard with a honeycomb configuration.

Contact elements 1 have faces which help define contact surfaces for engaging a roll of web material. As shown in FIG. 1, these contact surfaces may be formed by a planar surface which cooperates with contact elements 1. Contact elements 1 may be fixedly attached to support element 2. Like support elements 2, contact elements 1 may be made of paperboard and further may be made of paperboard with a honeycomb configuration. The shipping assembly depicted in FIG. 1 includes means for cushioning 3. Means for cushioning 3 is an inflatable bag, preferably an inflatable air bag. In one preferred embodiment, cushioning means 3 is an inflatable air bag constructed of paper. Air bags constructed of 8-ply kraft paper have been found to perform particularly satisfactorily in bracing paper rolls in rail cars.

The shipping assembly is made functional by inserting shipping chock 5 adjacent cylindrical unit of web material A. A second shipping chock 6 is inserted against a second cylindrical unit of web material B. Thereafter, means for cushioning 3 is inserted between shipping chock 5 and shipping chock 6. Upon activating the means for cushioning, force is applied to the associated support elements 2 thereby transferring force to the cylindrical units of web material A and B. The force applied by the shipping assembly to the units of web material serves to maintain the relative position of the units and to fill in the unwanted space therebetween. By retaining the position of the cylindrical units, the shipping assembly is able to prevent damage to the units.

Figure 2:
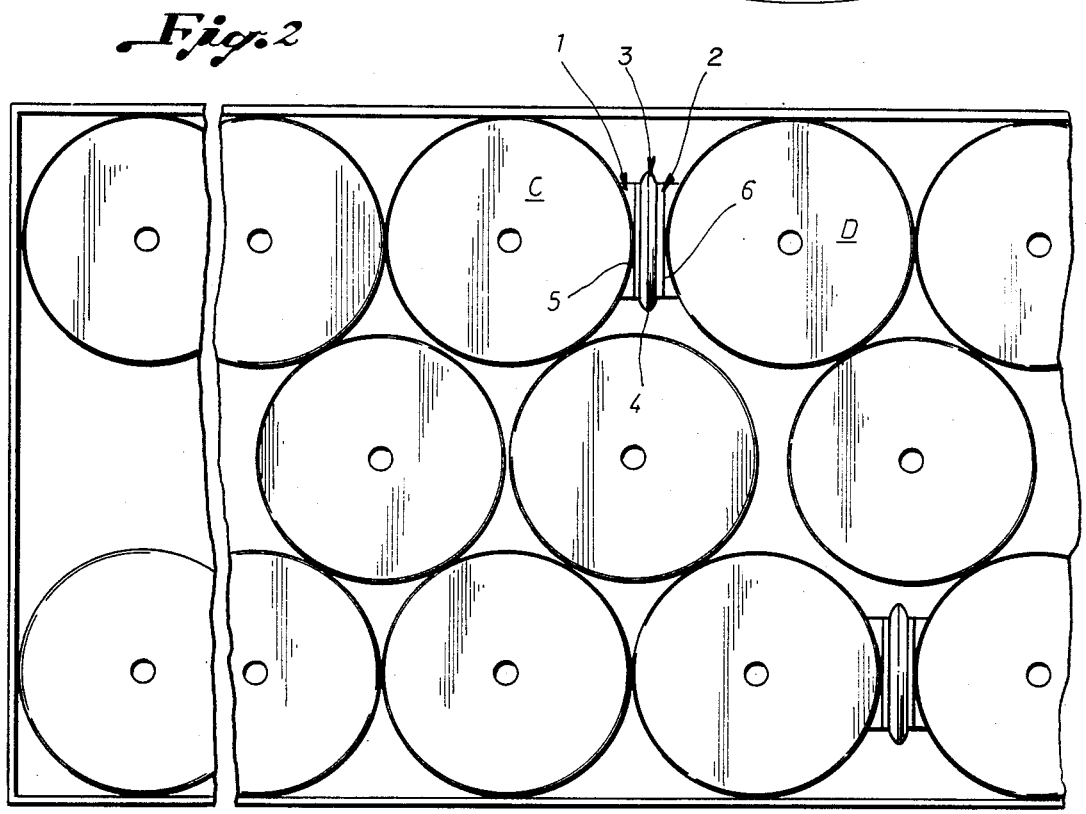
FIG. 2 is a plan view of the preferred embodiment of the present invention.

FIG. 2 is a plan view of the preferred embodiment of the present invention. Shipping chocks 5 and 6 have been inserted adjacent cylindrical units of a web material C and D, respectively. Means for cushioning 3 has been inserted between shipping chocks 5 and 6 and has been activated. The activation of means for cushioning 3 applies a force to the associated support elements 2 which is transferred to cylindrical units of web material C and D. The force exerted by the means for cushioning 3 is distributed by the surface of the chock over the engaged surface of the cylindrical unit of web material. This distribution of force is unique in the art and quite helpful. Since the pressure applied by cushioning means 3 is more evenly distributed over the surface of the cylindrical unit of web material, the unit of web material is more securely fixed.

The shipping assembly not only provides for a better securing mechanism for the cylindrical units of web material but also prevents failure of the cushioning means 3. Normally if cushioning means 3 were inserted between cylindrical units C and D, and C and D were allowed to shift, there would be a concentration of force upon the cushioning means 3 at the convex surface of the cylindrical units. Such a concentration of force increases the incidence of failure, release of pressure or rupture, of cushioning means 3. The failure rate is reduced due to the distribution of force associated with placing chocks 5 and 6 between cushioning means 3 and the adjacent cylindrical units of web material C and D. Thus, the use of the chocks 5 and 6 prevents the failure of cushioning means 3.

Another embodiment of the present invention can be utilized with only one cylindrical unit. A chock can be engaged between a cylindrical unit and the wall of the transporting vessel. If needed, cushioning means can be inserted between the chock and the wall.

In some situations, a chock or chocks may be adequate, without the aid of cushioning means, to secure the units to be transported.

Additional advantages and modifications will readily occur to those skilled in the art. The invention in its broader aspects is therefore not limited to the specific details, representative apparatus, and the illustrative examples shown and described. Accordingly, departures may be made from the detail without departing from the spirit or scope of the disclosed general inventive concept.

I claim:

1. A shipping assembly useful in maintaining the relative position of substantially cylindrical units during shipment, comprising:
    a pair of chocks in opposed relationship to each other, each said chock comprising
    a planar support surface, and
    a contact surface opposite said planar support surface, said contact surface conformed to effectively engage the surface of one of said cylindrical units; and
    a separately insertable inflatable member between said chocks, said separately insertable inflatable member being positioned to contact opposed planar support surfaces of said pair of chocks to exert a force upon said pair of chocks and upon said cylindrical units.

2. The shipping assembly of claim 1, wherein each of said chocks is made of paperboard.

3. The shipping assembly of claim 2, wherein each of said chocks is made of paperboard with an internal honeycomb configuration.

4. The shipping assembly of claim 1, wherein said contact surface is formed by a planar surface and a pair of contact elements which cooperate with said planar surface to effectively engage the surface of one of said cylindrical units.

5. The shipping assembly of claim 4, wherein said contact elements are constructed of paperboard.

6. The shipping assembly of claim 1, wherein said separate inflatable member comprises an inflatable air bag.

7. A shipping assembly useful in maintaining the relative position of paper rolls during shipment, comprising:
    first and second chocks, said first and second chocks each comprising,
    a planar support surface, and
    a contact surface opposite said planar support surface, said contact surface conformed to effectively engage the surface of one of said paper rolls, said pair of chocks arranged such that said planar support surfaces oppose one another in substantially parallel relation; and a separately insertable air bag between said chocks, said separately insertable inflatable air bag being positioned to contact said opposed planar support surfaces of said pair of chocks to exert a force upon said chocks and upon said paper rolls.

8. A method of bracing between two substantially cylindrical units during shipment, comprising:

placing a first chock against one of two proximate cylindrical units and placing a second chock against a second of said two cylindrical units, said pair of chocks placed in opposed relationship to one another, each said chock comprising, a planar support surface and a contact surface opposite said planar support surface, said contact surface conformed to engage the surface of one of said cylindrical units;

inserting a separate inflatable member between said chocks; and inflating said separate inserted inflatable member to cause said inflatable member to contact opposed planar surfaces of said pair of chocks to exert a force upon said pair of chocks and upon said cylindrical units.

9. A method of bracing between paper rolls during shipment, comprising:

placing a first chock adjacent a first of two proximately located paper rolls;

placing a second chock adjacent the second of said two proximately located paper rolls, each said chock comprising, a planar support surface, and a contact surface opposite said planar support surface, said contact surface conformed to engage the surface of one of said paper rolls, said first and second chocks placed such that said planar support surfaces are in spaced, substantially parallel relation to one another;

inserting a separate inflatable air bag between said spaced planar support surfaces; and inflating said separate inserted air bag to exert a force on said chocks and upon said paper rolls.

* * * * *